United States Patent [19]
Sakaguchi et al.

[11] 3,979,521
[45] Sept. 7, 1976

[54] METHOD FOR THE MANUFACTURE OF FRUIT WINES FROM FRUIT JUICES OF LOW SUGAR CONTENT

[75] Inventors: Yasuhiro Sakaguchi, Yokohama; Kiyoshi Ishii; Katumi Kojima, both of Ohimachi, all of Japan

[73] Assignee: Daicel Ltd., Osaka, Japan

[22] Filed: May 23, 1975

[21] Appl. No.: 580,295

[30] Foreign Application Priority Data
May 28, 1974  Japan.............................. 49-60019

[52] U.S. Cl. .............................................. 426/15
[51] Int. Cl.² ...................................... C12G 1/00
[58] Field of Search ............ 426/15, 478, 489, 490, 426/, 495

[56] References Cited
UNITED STATES PATENTS
3,342,729   9/1967   Strand................................ 426/495

OTHER PUBLICATIONS

Amerine et al., "The Technology of Winemaking" Aui Publishing Co. 1972, pp. 526–537.
Michaels, "New Separation Technique for CPI" Chem. Eng. Progress, vol. 64, Dec. 1968, pp. 31–43.

*Primary Examiner*—A. Louis Monacell
*Assistant Examiner*—R. B. Penland
*Attorney, Agent, or Firm*—Woodhams, Blanchard and Flynn

[57] ABSTRACT

Fruit wines excellent in taste and bouquet can be manufactured from fruit juices of low sugar content by subjecting the crude fruit juices to a semi-permeable membrane separation process (reverse osmosis or ultrafiltration), thereby to concentrate the crude fruit juices. The time periods required for fermenting the concentrated fruit juices and aging the wines made therefrom are considerably shorter in comparison with other wine-making processes.

7 Claims, No Drawings

METHOD FOR THE MANUFACTURE OF FRUIT WINES FROM FRUIT JUICES OF LOW SUGAR CONTENT

BACKGROUND OF THE INVENTION

1. Field of the Invention

This invention relates to a method for the manufacture of fruit wines in which crude fruit juices are concentrated by a semipermeable membrane separation process before fermentation and aging.

2. Description of the Prior Art

Generally, in Japan fruit juices of about 9 to 20 percent sugar content, and in the United States as well as in European countries fruit juices of about 18 to 34 percent sugar content, are used for making fruit wines. As is well known, however, fruit juices having about 20 to 40 percent sugar content are most desirable for making fruit wines.

When fruit juices, whose sugar content is 20 percent and below, are used for making fruit wines, in one conventional method the juices are not concentrated, but rather invert sugar is added to such juices before fermentation or alcohol is added to fruit wines made from such juices after fermentation. Alternatively the juices are concentrated either by the evaporation process or by the freezing process which involve applying special temperatures that may alter the properties of the fruit juices.

To concentrate or not to concentrate fruit juices: that is not the question in the least, because the consensus is that these conventional methods, as long as they use fruit juices of low sugar content, fail to produce fruit wines which must be remarkably distinguished in taste and aroma.

In terms of fermentation temperature, for instance, in producing white wines by the conventional methods, yeast is added to grape juice at 15°C, and the juice is fermented at 20°C and below. It is important that the fermentation temperature, once set at 20°C and below, should be controlled not to fluctuate. Otherwise, white wines of delicate aroma cannot be produced, as is described in *Food Industry and Microorganismus* by Koichi Yamada, published by Korin Shobo, Japan, 1965, page 221.

With respect to the time period required for making fruit wines by the conventional methods, it takes about 3 to 4 weeks to ferment fruit juices at about 15°C, and 1 to 5 years to age such fruit wines. Generally, a total of about 3 years is necessary to produce high quality fruit wines possessing desired taste and aroma.

SUMMARY OF THE INVENTION

This invention provides a process for manufacturing wines in which the starting fruit juice having a sugar content of about 20 to 40 weight percent is obtained by concentrating, by a semi-permeable membrane separation process, crude fruit juices having a sugar content of about 9 to about 20 weight percent. By thus concentrating the crude fruit juices, the acidity-causing substances and amino acids can be removed properly without altering other substances in the fruit juices, thus making it possible to obtain fruit wines which are very well balanced in flavor.

The concentrated fruit juices thus obtained can be fermented at 20° to 30°C in a remarkably shortened period of time, and the wines made therefrom can be aged also in a greatly shortened period of time.

DETAILED DESCRIPTION OF THE INVENTION

A process which used either reverse osmosis membranes or ultrafiltration membranes for concentrating fruit juices for drinking as a juice, i.e., without fermentation to form a wine, is known in the prior art. We have found that the art has not employed reverse osmosis membranes or ultrafiltration membranes especially for concentrating fruit juices of low sugar content for making fruit wines. Many of the membranes previously used for concentrating fruit juices for drinking are not satisfactory for preparing a concentrated fruit juice which can be made into wines excellent in taste and bouquet. Also the conditions under which fruit juices of low sugar content for making fruit wines are concentrated have not been fully studied yet. In view of these circumstances, the inventors have discovered a new membrane process for concentrating fruit juices of low sugar content to obtain a juice concentrate especially adapted for making fruit wines.

In our invention, crude fruit juices are concentrated by a semi-permeable membrane process including both the reverse osmosis membrane process and the ultrafiltration membrane process, preferably the reverse osmosis process. In concentrating the crude juices, we select (1) either one of these two processes and also (2) a type of the membrane most suitable for each kind of fruit juice. The respective membranes differ in permeability from each other.

As indicated in Table 1, in the fruit juices concentrated by our membrane process, the acidity of those hydroxycarboxylic acids which are mentioned later, as well as the nitrogen content of amino acids and sugar concentration are increased, but the increase of the acidity and the nitrogen content varies with the permeability of the membranes used. Essentially all of the sugars present in the crude fruit juice also remain in the concentrated fruit juice. The concentrations of the hydroxycarboxylic acids and amino acids in the concentrated juice are higher than in the crude juice, but the total amounts thereof in the concentrated juice are less than the total amounts in the crude juice, i.e. some of the acids and amino acids are removed by the concentration process. In other words, the extent to which the acidity and the nitrogen content are removed, depends upon, and can be controlled by, the selective permeability of the membranes used.

The foregoing rejection of the acidity and the nitrogen content is calculated by the equations (1) and (2) below:

1. Rejection of Acidity of Acids (%)

$$= \left(1 - \frac{\text{(Acidity in Concentrated Fruit Juices)}}{\text{(Acidity in Crude Fruit Juices} \times \text{Volume Ratio)}}\right) \times 100$$

2. Rejection of Nitrogen Content of Amino Acids (%)

$$= \left(1 - \frac{\text{(Nitrogen Content of Amino Acids in Concentrated Fruit Juices)}}{\text{(Nitrogen Content of Amino Acids in Crude Fruit Juices} \times \text{Volume Ratio)}}\right) \times 100$$

For the quantitative analysis of nitrogen-containing compounds contained in the fruit juice, the Vam Slyke method was used here. The acidity of acids contained in the fruit juice was determined as titratable acidity meaning the mol number of N NaOH required to neutralize 100 g of the fruit juice.

We found that the selective rejection, by semipermeable membranes, of the acidity caused by such hydroxycarboxylic acid constituents as tartaric, malic, and citric acids, brings about excellent effects in the manufacture of fruit wines in terms of taste and bouquet so that these properties are balanced very well in the wine products.

In more detail, when 10 to 60 percent, especially 20 to 50 percent, of the acidity and the amino acids in the starting crude fruit juice are removed by concentration of the crude fruit juice, and when the sugar is also concentrated to 20 to 40 percent, then the concentrated fruit juices can be fermented into fruit wines which are high in alcohol content and superior in taste and aroma to those wines manufactured by the conventional methods from the same starting crude juice.

The use of membranes possessing the property of NaCl rejection of 10 to 98 percent (DRS-0 to DRS-95), preferably 30 to 80 percent (DRS-20 to DRS-70) as shown in Table 2, is effective in producing fruit wines of excellent quality as indicated in Table 1. Also, the membrane process is operated under 20 to 70, preferably 30 to 70 kg/cm$^2$ pressure, as indicated in Table 1.

In our experiments, in the membrane separation process, according to our invention, the crude fruit juices are fed into the membranes at the rate of 0.3 to 2.8 m/sec. in terms of linear velocity (or 200 to 800 l/hr. in the examples we cite later) and at a temperature of 40°C and below.

The reverse osmosis and ultrafiltration membranes used in this invention are cellulose acetate semi-permeable membranes, acrylonitrile-vinyl pyrrolidone semi-permeable membranes, and semi-permeable membranes made of other synthetic polymers.

The fermenting of the concentrated fruit juices in this invention can be performed in the usual way known in the prior art, but the fermentation temperature can range from 20° to 30°C.

As Table 1 shows, to the fruit juices concentrated by the membranes process we have invited, there is added yeast for making wine, and the resulting mixture is fermented at a comparatively high temperature of 20° to 30°C for a period of 6 to 7 days which is much shorter than the 3 or 4 weeks required in the conventional methods.

In addition, the aging of the fruit wines thus manufactured from the foregoing concentrated fruit juices can be carried out in about 2 to 3 months, which is remarkably shorter than the 1 to 5 years necessary in the conventional methods.

Table 1

TEST RESULTS OF TASTE AND BOUQUET OF WINES MADE FROM FRUIT JUICES TREATED BY THE PROCESS OF THE INVENTION

| Test No. | Fruit | Process for Concentration | Membrane | Hydrostatic Pressure (kg/cm$^2$) | Concentration crude juice / concentrated juice | Temperature (°C) |
|---|---|---|---|---|---|---|
| 1-0 | Grape | Vacuum Evaporation | — | — | 2 | 85 – 35 |
| 1-1 | | Separation by membrane | DRS-95 | 70 | 2 | 16 – 17 |
| 1-2 | | Separation by membrane | DRS-90 | 70 | 2 | 16 – 17 |
| 1-3 | | Separation by membrane | DRS-70 | 70 | 2 | 16 – 17 |
| 1-4 | | Separation by membrane | DRS-50 | 50 | 2 | 16 – 17 |
| 1-5 | | Separation by membrane | DRS-20 | 30 | 2 | 16 – 17 |
| 1-6 | | Separation by membrane | DRS-0 | 20 | 1.9 | 16 – 17 |
| 1-7 | | Separation by membrane | DUY-01 | 10 | 1.4 | 16 – 17 |
| 1-8 | | Separation by membrane | DRS-50 | 40–70 | 3.4 | 16 – 17 |

Quantitative Changes in Ingredients of Fruit Juices Treated by the Concentration Process

| Sugar Content | | | Acidity | | | Nitrogen Content of Amino Acids | | | Fermentation | | Aging | | Taste and Bouquet |
|---|---|---|---|---|---|---|---|---|---|---|---|---|---|
| Crude Juice (%) | Concentrated Juice (%) | Concentration Ratio * | Crude Juice (%) | Concentrated Juice (%) | Rejection (%) | Crude Juice (mg/l) | Concentrated Juice (mg/l) | Rejection (%) | Temperature (°C) | Time (day) | Temperature (°C) | Time (month) | |
| 12.0 | 24.0 | 2 | 1.02 | 2.04 | 0 | 19.5 | 34.0 | 11.6 | 22±4 | 6–7 | 15 | 3 | Fair |
| 12.0 | 24.2 | 2.02 | 1.02 | 2.03 | 1.5 | 19.5 | 38.5 | 2.5 | 22±4 | 6–7 | 15 | 3 | Good |
| 12.0 | 24.2 | 2.02 | 1.02 | 1.96 | 4.8 | 19.5 | 36.3 | 7.8 | 22±4 | 6–7 | 15 | 3 | Good |
| 12.0 | 24.0 | 2.0 | 1.02 | 1.73 | 15.0 | 19.5 | 34.5 | 11.6 | 22±4 | 6–7 | 15 | 3 | Excellent |
| 12.0 | 23.8 | 1.98 | 1.02 | 1.20 | 40.5 | 19.5 | 27.6 | 28.5 | 22±4 | 6–7 | 15 | 3 | Excellent |
| 12.0 | 23.0 | 1.91 | 1.02 | 0.82 | 58.0 | 19.5 | 18.5 | 50.4 | 22±4 | 6–7 | 15 | 3 | Excellent |
| 12.0 | 22.4 | 1.87 | 1.02 | 0.65 | 66.0 | 19.5 | 11.4 | 68.8 | 22±4 | 6–7 | 15 | 3 | Fair |
| 12.0 | 16.2 | 1.35 | 1.02 | 0.40 | 71.0 | 19.5 | 8.5 | 67.2 | 22±4 | 6–7 | 15 | 3 | Inferior |
| 12.0 | 40.7 | 3.38 | 1.02 | 2.00 | 42.0 | 19.5 | 35.0 | 47.0 | 22±4 | 6–7 | 15 | 3 | Excellent |

Table 1

| Test No. | Fruit | Process for Concentration | Membrane | Hydrostatic Pressure (kg/cm²) | Concentration crude juice concentrated juice | Temperature (°C) |
|---|---|---|---|---|---|---|
| 2-0 | Apple | Vacuum Evaporation | — | — | 2.4 | 85 – 35 |
| 2-1 |  | Separation by membrane | DRS-95 | 70 | 2.4 | 16 – 17 |
| 2-2 |  | Separation by membrane | DRS-50 | 50 | 2.4 | 16 – 17 |
| 2-3 |  | Separation by membrane | DRS-0 | 20 | 2.4 | 16 – 17 |
| 2-4 |  | Separation by membrane | DUY-01 | 10 | 1.5 | 16 – 17 |
| 3-0 | Mandarin orange | Vacuum Evaporation | — | — | 4.0 | 85 – 35 |
| 3-1 |  | Separation by membrane | DRS-95 | 70 | 3.9 | 16 – 17 |
| 3-2 |  | Separation by membrane | DRS-50 | 50 | 3.9 | 16 – 17 |
| 3-3 |  | Separation by membrane | DRS-0 | 20 | 3.9 | 16 – 17 |

Quantitative Changes in Ingredients of Fruit Juices Treated by the Concentration Process

| Sugar Content | | | Content | | | Nitrogen Content of Acidity | | | Amino Acids | | Fermentation | | Aging |
|---|---|---|---|---|---|---|---|---|---|---|---|---|---|
| Crude Juice (%) | Concentrated Juice (%) | Concentration Ratio * | Crude Juice (%) | Concentrated Juice (%) | Rejection (%) | Crude Juice (mg/l) | Concentrated Juice (mg/l) | Rejection (%) | Temperature (°C) | Time (day) | Temperature (°C) | Time (month) | Taste and Bouquet |
| 12.6 | 30.2 | 2.4 | 0.44 | 1.05 | 0 | 8.88 | 17.42 | 9.5 | 22±4 | 6–7 | 15 | 3 | Fair |
| 12.6 | 30.9 | 2.57 | 0.44 | 0.96 | 15.0 | 8.88 | 21.77 | 4.8 | 22±4 | 6–7 | 15 | 3 | Good |
| 12.6 | 30.2 | 2.40 | 0.44 | 0.68 | 57.5 | 8.88 | 15.36 | 28.0 | 22±4 | 6–7 | 15 | 3 | Excellent |
| 12.6 | 30.4 | 2.53 | 0.44 | 0.38 | 65.8 | 8.88 | 7.21 | 68.0 | 22±4 | 6–7 | 15 | 3 | Good |
| 12.6 | 18.5 | 1.47 | 0.44 | 0.20 | 69.0 | 8.88 | 4.45 | 66.0 | 22±4 | 6–7 | 15 | 3 | Inferior |
| 8.6 | 33.2 | 3.86 | 0.81 | 3.12 | 0 | 25.9 | 90.2 | 10.0 | 22±4 | 6–7 | 15 | 3 | Fair |
| 8.6 | 33.4 | 3.87 | 0.81 | 3.00 | 5.4 | 25.9 | 94.6 | 6.0 | 22±4 | 6–7 | 15 | 3 | Good |
| 8.6 | 32.2 | 3.86 | 0.81 | 2.30 | 26.0 | 25.9 | 66.5 | 33.5 | 22±4 | 6–7 | 15 | 3 | Excellent |
| 8.6 | 33.0 | 3.84 | 0.81 | 1.35 | 56.6 | 25.9 | 37.8 | 62.0 | 22±4 | 6–7 | 15 | 3 | Good |

Note:

* Concentration Ratio = $\dfrac{\text{Sugar Content of Concentrated Fruit Juices}}{\text{Sugar Content of Crude Fruit Juices}}$ Table 2

PROPERTIES OF MEMBRANES

| Type of Membrane | Material of Membrane | Thickness of Membrane (μ) | NaCl ** Rejection (%) | Water Flux *** (m³/m² · day) | Hydrostatic Operating Pressure (kg/cm²) | Fractional **** Molecular Weight |
|---|---|---|---|---|---|---|
| DRS-95 | Cellulose diacetate | 150 | 96 – 98 | 0.8 | 40 |  |
| DRS-90 | Cellulose diacetate | 150 | 86 – 94 | 0.8 | 40 |  |
| DRS-70 | Cellulose diacetate | 150 | 60 – 80 | 3.0 | 40 |  |
| DRS-50 | Cellulose diacetate | 150 | 40 – 60 | 2.5 | 40 |  |
| DRS-20 | Cellulose diacetate | 150 | 30 – 40 | 2.5 | 30 |  |
| DRS-0 | Cellulose diacetate | 150 | 0 – 10 | 2.5 | 25 |  |
| DUY-01 | Acrylic * copolymer | 150 | 0 – 5 | 3 | 3.5 | 1,000 |
| DUY-10 | Acrylic * copolymer | 150 | 0 | 10 | 3.5 | 10,000 |

* Acrylonitrile-Vinyl Pyrrolidone Copolymer
** The percentages measured during 30 min. of the 2nd test under the conditions that 350 ppm NaCl aqueous solution was fed at 25°C under the pressure shown in the table.
*** Initial values when distilled water was fed at 25°C under the regulated pressures shown in the next column.
**** Molecular weight of spherical molecules which are formed in a solution and are of the maximum size for use as ultrafiltration membranes.

Weather and soil conditions in, or the climatic conditions of, the area where fruits are cultivated, are regarded as predominant factors in determining the qualities of crude fruit juices for making fruit wines. If fruits are cultivated under unfavorable conditions, they may contain a low sugar content and other undesirable properties for making fruit wines. Yet such fruits can be effectively used in this invention for making fruit wines superior in taste and bouquet.

In short, by the method according to the invention, in which crude fruit juices of low sugar content are concentrated by the reverse osmosis membrane separation process or the ultrafiltration membrane separation process, there can be made fruit wines which are equal in flavor even to Sauterne wine made in France.

The fruit juices used in this invention as starting materials are those which are made from apples, grapes, mandarin oranges, and strawberries, and fruit wines made from those juices are red, white, mandarin, strawberry, and many other wines.

The present invention is further described by reference to the following illustrative examples.

EXAMPLE 1

Fresh fruit juice of Koshu grape of 12 percent sugar content was concentrated under the conditions of a hydrostatic pressure of 70 kg/square centimeter, and a feed rate of 800 liters/hour, without heating, by a reverse osmosis membrane process which uses an apparatus, described below, made by Daicel Ltd., to give a concentrated grape juice of 24 percent sugar content. Then, 100 liters of the concentrated grape juice was inoculated with OC-2, which is a symbol for a standard wine-making yeast registered at the Fermentation Society of Japan, and was allowed to stand at room temperature of 22° ± 4°C for 6 days for effecting fermentation.

The fermented juice thus obtained was purified by microfiltration, and the filtered fermented juice was stored at 15°C for 2 months for aging. After this process, there was obtained a high grade of grape wine characterized by fine smell and taste.

The foregoing reverse osmosis apparatus used comprised tubular modules containing membranes (DRS-70), whose total area is 10 square meters, and whose permselectivity is 70 percent in terms of sodium chloride rejection, as indicated in Table 2.

EXAMPLE 2

Fresh fruit of Unshu mandarin orange of 8.6 percent sugar content was treated by the same apparatus as described in Example 1 to obtain concentrated mandarin orange juice of 33 percent sugar content. Then, 100 liters of this concentrated juice was inoculated with the OC-2 yeast, and was allowed to stand at room temperature of 22° ± 4°C for 8 days for effecting fermentation. The mandarin orange wine was then filtered and aged in the same manner as mentioned in Example 1 to finally obtain a high quality mandarin wine.

EXAMPLE 3

Fresh fruit juice of Kokko apple of 12.6 percent sugar content was concentrated with the same apparatus as explained in Example 1 to give concentrated apple juice of 28 percent sugar content. The juice then was inoculated with the OC-2 yeast, and was allowed to stand at room temperature of 22° ± 4°C for seven days for effecting fermentation. The resulting wine was filtered and aged in the same way as in Example 1 to produce a high quality apple wine which was outstanding both in taste and smell.

EXAMPLE 4

Fresh strawberry juice of 6.5 percent sugar content was treated with the same apparatus as described in Example 1 under a hydrostatic pressure of 50 kg/square centimeter to obtain concentrated strawberry juice of 25 percent sugar content. The concentrated juice was then inoculated with the OC-2 yeast, and was allowed to stand at room temperature of 22° ± 4°C for 6 days for effecting fermentation. The resulting wine was filtered and aged by the same method as shown in Example 1 to yield a high quality strawberry wine which also was excellent in taste and bouquet.

The embodiments of this invention in which an exclusive property or privilege is claimed are defined as follows:

1. A method of manufacturing fruit wine, starting with a crude fruit juice containing from about 9 to about 20 percent by weight of sugars and containing hydroxycarboxylic acids and amino acids, which comprises the steps of:

flowing said crude fruit juice in contact with a semipermeable separation membrane and thereby removing water and from 10 to 60 percent by weight of said hydroxycarboxylic acids and amino acids from said crude fruit juice, and recovering a concentrated fruit juice containing from about 20 to about 40 percent by weight of said sugars constituting essentially all of the sugars originally present in the crude fruit juice, said concentrated fruit juice also containing the remainder of said hydroxycarboxylic acids and amino acids; inoculating said concentrated fruit juice with a wine-making yeast; fermenting said inoculated concentrated fruit juice to transform same into a fruit wine and aging said wine.

2. A method as claimed in claim 1 in which from 20 to 50 percent by weight of said hydroxycarboxylic acids and amino acids present in said crude fruit juice are removed by said membrane.

3. A method as claimed in claim 2 in which the membrane is a cellulose diacetate membrane having the property of removing from 30 to 80 weight percent of NaCl when an aqueous solution containing 350 ppm of NaCl is flowed through the membrane, at 25°C, under a hydrostatic pressure of 10 to 100 kg/cm$^2$.

4. A method as claimed in claim 3 in which the hydrostatic pressure of the crude fruit juice in contact with the membrane is from 20 to 70 kg/cm$^2$, the flow rate thereof is 0.3 to 2.8 m/sec., and the temperature thereof is not more than 40°C.

5. A method as claimed in claim 1 in which the membrane is a cellulose diacetate membrane having the property of removing from 10 to 98 weight percent of NaCl when an aqueous solution containing 350 ppm of NaCl is flowed through the membrane, at 25°C, under a hydrostatic pressure of 10 to 100 kg/cm$^2$.

6. A method as claimed in claim 1 in which the hydrostatic pressure of the crude fruit juice in contact with the membrane is from 20 to 70 kg/cm$^2$, the flow rate thereof is 0.3 to 2.8 m/sec., and the temperature thereof is not more than 40°C.

7. A method as claimed in claim 1 in which the inoculated concentrated fruit juice is fermented at 20° to 30°C for about 6 or 7 days and the wine is aged for about 2 to 3 months to produce a fruit wine suitable for bottling and drinking.

* * * * *